United States Patent

Star

[15] 3,640,492
[45] Feb. 8, 1972

[54] MODULAR AIRCRAFT STRUCTURES

[72] Inventor: Moe Star, Los Angeles, Calif.

[73] Assignee: Northrop Corporation, Beverly Hills, Calif.

[22] Filed: Feb. 19, 1970

[21] Appl. No.: 12,670

[52] U.S. Cl. ............................. 244/124, 244/131, 244/120
[51] Int. Cl. .................................................. B64c 1/00
[58] Field of Search ....................... 244/120, 124, 131, 2

[56] References Cited

UNITED STATES PATENTS 2,380,289  7/1945  Burnelli ............................. 244/124
3,017,137  1/1962  Helmke et al ...................... 244/124

Primary Examiner—Milton Buchler
Assistant Examiner—Steven W. Weinrieb
Attorney—Harold L. Fox and Willard M. Graham

[57] ABSTRACT

A mission-oriented avionics complement for military and like aircraft is insured by the use of interchangeable units or modules containing electronic or avionic equipment. These units are packaged to form part of the aircraft structure and conform with and maintain the aircraft's aerodynamic configuration and mold lines. These units configured as sections of wing, fuselage, tail, etc., are provided with quick mechanical and electrical connect-disconnect mechanisms. Internally provided electrical cables serve to integrate the plug-in electronic elements with the internally mounted power supply, display and control elements thereby enabling them to perform a required avionic function.

1 Claims, 2 Drawing Figures

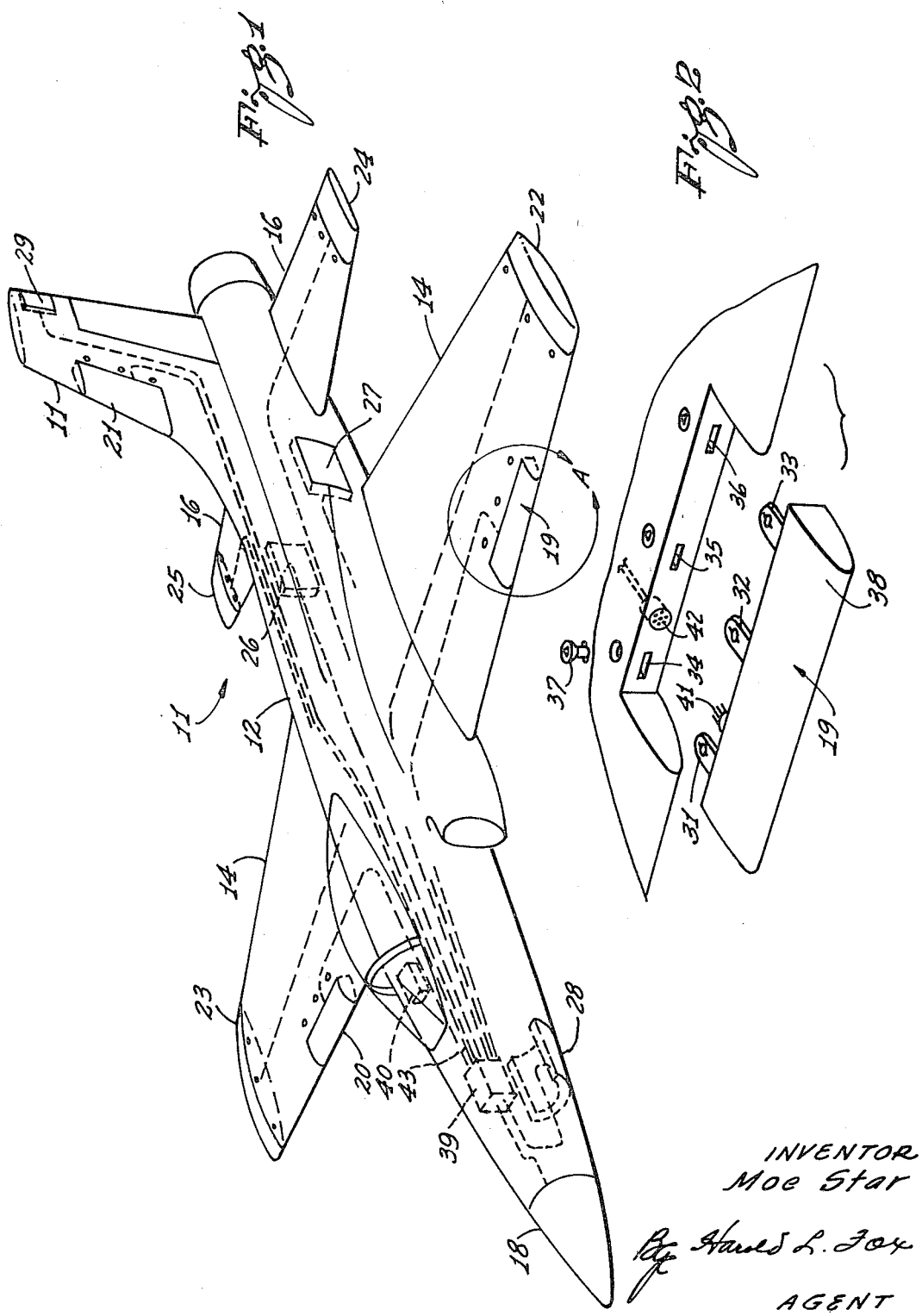

MODULAR AIRCRAFT STRUCTURES

The present invention pertains to replaceable and/or interchangeable components for aircraft and the like and more particularly to self-contained replaceable and/or interchangeable units for military aircraft enabling the latter to operate at maximum efficiency under various operational environments.

Frequently it becomes necessary to replace electronic and like equipment carried by a military aircraft. Electronic gear carried by strike or reconnaissance aircraft on a specific mission may encounter entirely different environmental conditions than the previous mission, requiring electronic equipment that functions to serve an entirely different purpose. Also, on occasions, replacements may be required due to damage as a result of enemy action. In either case, the gear must be substituted for or a replacement provided as quickly as possible.

Briefly the replacement or change of equipment as disclosed herein is effected in that the subject gear, and practically all associated components, are mounted in self-contained units or modules. The subject units are complete with the exception of a power source, control and processing equipment, pilot input equipment etc., which function to integrate these units into complete avionics subsystem tailored to perform a specific mission. The outer surfaces of the units constitute skin portions of the aircraft. Each unit is provided with conventional connect-disconnect means enabling a unit to be quickly and easily inserted in place of a unit having entirely different operational characteristics or for a damaged unit. As mentioned above the outer portion of each unit comprises sheet material forming in part the aircraft's skin and complementing the overall configuration of the aircraft to retain its aerodynamic configuration. Electrical connection, of the plug-in type, renders the electronic equipment operational, thus the self-contained units become integral parts of the aircraft and may constitute leading and trailing edges of the wings, tail sections, portions of the fuselage etc., and may be replaced and secured in position, both mechanically and electrically, from a position externally of the aircraft in a manner more fully described as the disclosure progresses.

An object of the present invention is to provide self-contained electronic units which may be electrically and mechanically installed from a position external of an aircraft.

Another object is to provide self-contained units having electronic and like equipment mounted therein which may be installed quickly and easily in an aircraft from a position external thereof and which functions to maintain the overall aerodynamic configuration of the aircraft in which the same are installed.

FIG. 1 is a perspective view of an aircraft showing electronic or like units as disclosed herein mounted in the aircraft.

FIG. 2 is a perspective view of the area of Figure 1 enclosed within the circle indicated by the letter A showing a self-contained unit and the method in which it may be substituted or replaced.

Referring to the drawing, a jet airplane 11 embodying the units or modules as described herein is shown in Figure 1. The airplane 11 includes the usual components, viz, fuselage, wings, horizontal and vertical stabilizers 12, 14, 16 and 17, respectively.

Various self-contained units or modules 18–29, inclusive, are carried by the aircraft 11 which may be interchanged or replaced readily and easily from a position externally of the aircraft. The units 18–29 are located at suitable positions on the airplane 11, for example—one of the units (unit 18) may constitute the nose portion of the airplane 11, other units (units 19, 20 and 21) may be mounted in the leading edges of the wings 14 and vertical stabilizer 17, other units (units 22, 23, 24 and 25) may constitute the outer end portions of the wings 14 and horizontal stabilizers 16 and still other units (units 26 and 27) may be mounted in the fuselage 12 etc., substantially as shown in Figure 1.

Each of the units 18–29 constitute complete electronic units or modules enabling each to operate and function as a unit or separate entity. The outer surface of each of the units 18–29 comprises sheet material having the same configuration and substantially the same physical characteristics as the skin of the airplane 11 adjacent the unit being substituted for or replaced. Accordingly it will be apparent that the original units 18–29 may be replaced by like units, or substituted for by units having the same physical characteristics and configuration, but providing entirely different functions enabling the airplane 11 to carry out an entirely different type of mission.

In this respect, it is pointed out that electrical connections are effected at such time as a unit is installed in the airplane 11. Referring to FIG. 2, it will be seen that one of the units (unit 19) is being substituted for or replaced. The unit 19 carries a plurality of locating pins 31–33 that enter respective apertures or holes 34–36 and function to position unit 19 so that the prongs of a male plug 41, carried by the unit 19, are received in a female plug 42, carried by aircraft structure. Thus it will be seen that electrical power and signals will be supplied to the unit 19 as the latter is positioned in its proper position in the wing 14 (left wing).

Mechanical connections are effected by conventional quick connect-disconnect mechanisms 37. Thus it will be seen that electrical connections will be effected at such time as the unit 19 is properly positioned in the wing 14 with the locating pins 31–33 received in the holes 34–36. Also the aerodynamic configuration of the wing 14 will be preserved, that is, the edges of the sheet material 38 will coincide with the edges of the skin of the wing 14 thus insuring a common interface. The quick connect-disconnect mechanism 37 are then actuated securing the unit 19 rigidly and securely in position.

Electrical signals constituting electrical power, control, processing, display, pilot input etc., originating in the units 39 and 40 are transmitted to and from the unit 19 by cables 43 and electrical plugs 41 and 42.

The physical construction of units 18–29, and the method in which the electrical and mechanical connections are made having been described, a better understanding of the invention will be forthcoming from the following description in which the airplane 11 is subject to two entirely different missions.

Assuming that the aircraft 11 is first required to carry out an attack mission against a target area defended by X-band radar, but with friendly air superiority with command and control and navigation supplied via satellite communication system. For this mission, unit 18 might be a laser ranger for weapon delivery, 19 a radar altimeter, 20 a X-band barrage jammers, 22 and 23 antenna, transmitter and receivers for satellite communications. Units 21, 24, 25, 26 and 27 would carry no equipment, only structural components. Thus the aircraft 11 is equipped to carry out the mission described above.

Assuming at a later time the aircraft 11 is to be equipped to fly a reconnaissance mission. In this case the unit 18 will be replaced by a unit having the same physical configuration as before but containing IR equipment, units 20, 22 and 23 constitute mapping radar equipment, 26 and 27 communicating equipment, 29 tail warning equipment, 24 and 25 IR counter measures. Thus the aircraft 11 is now equipped to carry out the second mission.

It will be apparent that the above substitution or changes may be made easily and readily effected from outside the airplane 11 and the same made ready, with a minimum loss of time, for its second or turnaround mission. Also it will be apparent that replacements of the units with units performing the same function can be effected with a minimum loss of time if an original unit is damaged by enemy action or for any other reason.

I claim:

1. In an aircraft structure including a fuselage and aerodynamic surfaces, the combination comprising:
   a. at least one intermediate portion of aircraft structure having a recess in the exterior thereof adapted to receive an assembly module therein;
   b. a replaceable plug-in module shaped to fit in said recess and complete the normal external configuration of said aircraft, said module having avionics equipment built therein;

c. quick disconnect means in said recess mating with quick disconnect means in said module, comprising locating pins on said module, alignment apertures in the aircraft structure adjacent said recess receiving said pins to position said module, means securing said pins in said apertures, and electrical plug and receptacle means positioned respectively in said module and recess to mate together when said module is fit into position to operatively connect said avionics;

d. wherein said module and recess are on the leading edge of one of said surfaces, and wherein said securing means is on the external side of said aircraft; and e. whereby various types of avionics gear can be easily removed and installed in said aircraft.

* * * * *